(12) United States Patent
Timonen

(10) Patent No.: US 9,248,881 B2
(45) Date of Patent: Feb. 2, 2016

(54) LOCKING HINGE FOR TUBULAR FRAME

(71) Applicant: GM Global Technology Operations LLC, Detroit, MI (US)

(72) Inventor: Jussi A. Timonen, Los Angeles, CA (US)

(73) Assignee: GM Global Technology Operations LLC, Detroit, MI (US)

(*) Notice: Subject to any disclaimer, the term of this patent is extended or adjusted under 35 U.S.C. 154(b) by 23 days.

(21) Appl. No.: 14/225,815

(22) Filed: Mar. 26, 2014

(65) Prior Publication Data

US 2015/0274243 A1    Oct. 1, 2015

(51) Int. Cl.
*B62K 15/00* (2006.01)
*E05D 11/10* (2006.01)

(52) U.S. Cl.
CPC .......... *B62K 15/006* (2013.01); *E05D 11/1007* (2013.01)

(58) Field of Classification Search
CPC .... B62K 15/008; B62K 15/006; B62K 15/00; E05D 11/1007
USPC .......................................................... 280/278
See application file for complete search history.

(56) References Cited

U.S. PATENT DOCUMENTS 5,553,351 A * 9/1996 Starks .............................. 16/223
2011/0057413 A1* 3/2011 Lee ................................. 280/278

* cited by examiner

*Primary Examiner* — Kevin Hurley
(74) *Attorney, Agent, or Firm* — BrooksGroup

(57) ABSTRACT

A number of variations may include a locking hinge for a tubular frame, which may include a first tubular frame and a second tubular frame connected by a hinge for movement relative one another between folded and unfolded positions; a threaded shaft rotatably mounted in the first tubular frame to selectively rotate and advance from the first tubular frame and rotate and withdraw into the first tubular frame;
an internally threaded nut mounted in the second tubular frame;
and a motor mechanism for rotating the threaded shaft.

20 Claims, 3 Drawing Sheets

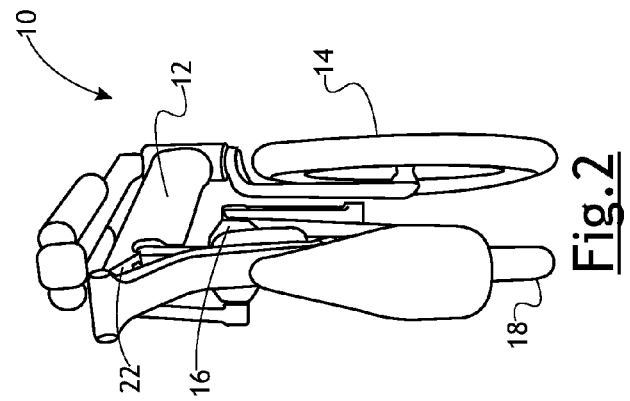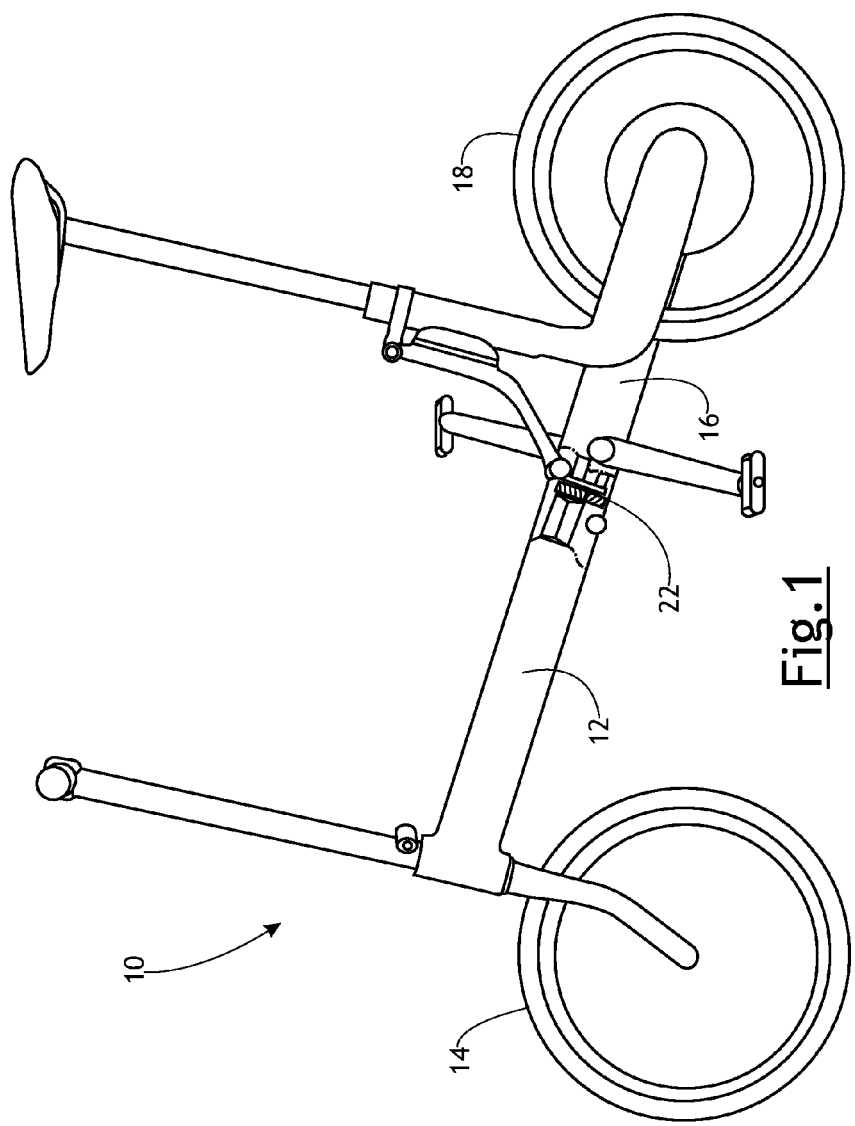

1

LOCKING HINGE FOR TUBULAR FRAME

TECHNICAL FIELD

The field to which the disclosure generally relates is locking of hinged tubular frames.

BACKGROUND

Tubular frames may be connected by a hinge for hinged movement between folded and unfolded positions.

SUMMARY OF ILLUSTRATIVE VARIATIONS

A number of variations may include a locking hinge for a tubular frame.

BRIEF DESCRIPTION OF THE DRAWINGS

Select examples of variations within the scope of the invention will become more fully understood from the detailed description and the accompanying drawings, wherein:

FIG. 1 is a side elevation view of a bicycle having a hinged tubular frame.

FIG. 2 shows the bicycle of FIG. 1 folded to facilitate storage of the bicycle.

DETAILED DESCRIPTION OF ILLUSTRATIVE VARIATIONS

Figure 3:
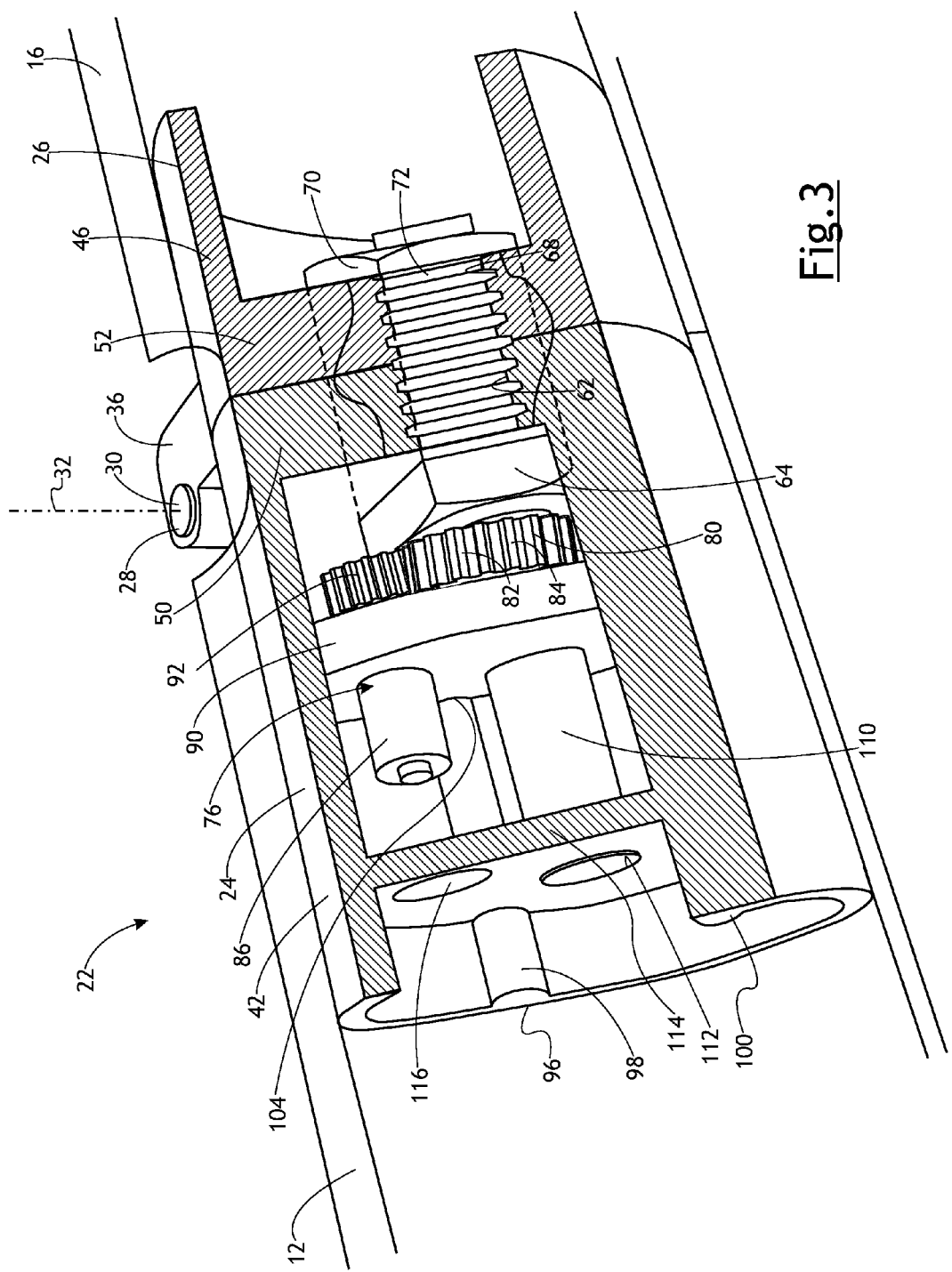
FIG. 3 is a perspective view, having parts broken away and in section, of a number of variations of a locking hinge for a tubular frame, and shown in the locked position preventing hinged movement.

The following description of the variations is merely illustrative in nature and is in no way intended to limit the scope of the invention, its application, or uses.

A number of variations are illustrated in FIGS. 1 and 2, which may include a bicycle 10. Bicycle 10 may include a first tubular frame such as a front frame 12 which may support a front wheel 14 and a second tubular frame such as a rear frame 16 that may support a rear wheel 18. FIG. 1 shows the bicycle in its normal riding position. The front frame 12 and rear frame 16 may be of hollow tubular construction.

The bicycle 10 of FIG. 1 may have locking hinge 22 that connects the front frame 12 with the rear frame 16. During normal riding of the bicycle, as seen in FIG. 1, the front frame 12 and the rear frame 16 are in their unfolded position with respect one another and the locking hinge 22 is locked to prevent the bicycle 10 from folding. In FIG. 2, the locking hinge 22 has been unlocked and the bicycle frame has been folded to bring the front wheel 14 and the rear wheel 18 into a parallel side-by-side relationship in which the bicycle 10 may be easily stored.

Figure 4:
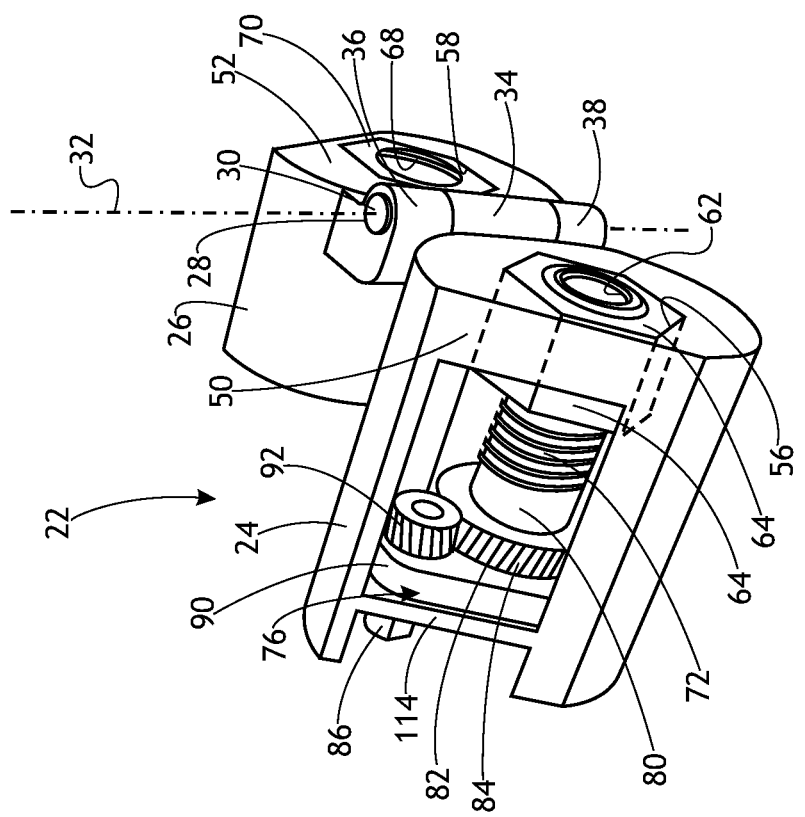
FIG. 4 shows the locking hinge in the unlocked position permitting folding of the tubular frame.

In FIGS. 3 and 4, several variations of the locking hinge 22 are shown. The locking hinge 22 may include a first hinge half 24 and a second hinge half 26 that may be connected by a pivot 28 which may be a pivot pin 30 establishing a hinge axis 32. The first hinge half 24 and the second hinge half 26 may each be a die casting or machined part made of metal or may be an injection mold part made of plastic. As seen in FIG. 4, the first hinge half 24 may have a flange 34 projecting laterally from a side of the first hinge half 24 and the second hinge half 26 may have a pair of flanges 36 and 38 that project laterally from the side of the second hinge half 26 and are vertically spaced apart to closely surround and capture the flange 34 of the first hinge half 24. The pivot pin 30 extends through aligned holes in these flanges 34, 36, and 38 so that the first hinge half 24 and the second hinge half 26 may pivot relative one another about hinge axis 32.

As seen in FIGS. 3 and 4, the first hinge half 24 is generally of a hollow cylindrical shape including a cylindrical wall 42 that may be press fit into the interior of the front frame 12. The second hinge half 26 may be a generally hollow cylindrical shape including a cylindrical wall 46 that may be press fit into the interior of the rear frame 16.

As seen in FIG. 3, the right-hand end of the cylindrical wall 42 of the first hinge half 24 is closed by a laterally extending bulkhead 50 which may be integral with the cylindrical wall 42 or may be a separate part that is press fit or otherwise installed into the right-hand end of the cylindrical wall 42. The left hand end of the cylindrical wall 46 of the second hinge half 26 is closed by a laterally extending bulkhead 52 which may be integral with the cylindrical wall 46 or may be a separate part that is press fit or otherwise installed into the left hand end of the cylindrical wall 46. FIG. 3 shows the front frame 12 and the rear frame 16 in a straight-line coaxial relationship in which the bulkheads 50 and 52 are abutting with one another and establish the unfolded position of the bicycle 10.

As seen in FIG. 4, the bulkhead 50 may have a hole 56 and the bulkhead 52 may have a hole 58 that aligns with one another. The aligned holes 56 and 58 may be hex shaped to receive and mount hex nuts therein. The bulkhead 50 is provided with internal threads 62 that may be provided by welding or otherwise attaching a hex nut 64 on the bulkhead 50 with internal threads of the hex nut 60 providing the internal threads 62. As an alternative, the internal threads 62 may be provided by machining the threads directly within the hole 56 of the bulkhead 50. The bulkhead 52 is provided with internal threads 68 that may be provided by welding or otherwise attaching a hex nut 70 on the bulkhead 52 with the internal threads of the hex nut 70 providing the internal threads 68. The hole 56 and the bulkhead 50 may be hex shaped to receive and mount the hex nut 64. As an alternative, the internal threads 68 may be provided by machining these threads 68 directly in the hole 56 of the bulkhead 52.

As seen in FIG. 3, the front frame 12 and the rear frame 16 may be locked together in their straight-line coaxial unfolded position of FIG. 3 by installing a threaded shaft 72 into the internal threads 62 of the hex nut 64 attached to bulkhead 50 and internal threads 68 of the nut 70 attached to bulkhead 52. Any attempt to fold the frames 12 and 16 about the pivot pin 30 would be thwarted by the threaded engagement between the threaded shaft 72 and the internal threads 62 and 68.

A motor mechanism, generally indicated at 76, is provided for rotating the threaded shaft 72 between its extended position shown in FIG. 3 where the locking hinge 22 is locked, and a withdrawn position of FIG. 4 where the locking hinge 22 is unlocked to allow folding of the front frame 12 and rear frame 16 relative to one another. In FIG. 3, the threaded shaft 72 may be provided by a bolt 80 which may have a head 82 that may be a toothed gear 84. An electric motor 86 may be a geared direct-current motor that may be mounted on a carriage 90. Electric motor 86 may have a shaft that drives a toothed gear 92 that meshes with the toothed gear 84. Energization of the electric motor 86 may drive the toothed gear 92, which in turn drives to toothed gear 84 to rotate the threaded shaft 72. The threaded shaft 72 may be hollow to save weight.

The carriage 90, which may be a round disc, is mounted on the interior of the first hinge half 24 by a track mechanism 96 that will guide the carriage 90 in left and right movement within the hollow interior of the first hinge half 24 while also preventing the carriage 90 from rotating within the hollow interior of the first hinge half 24. The track mechanism 96 may includes a first guide track 98 and a second guide track 100. These guide tracks 98 and 100 may be formed integrally on the interior of the cylindrical wall 42 of the first hinge half 24. The guide tracks 98 and 100 may be diametrically opposed from one another as shown in FIG. 3. The carriage 90 may have a notch 104 that rides on guide track 98 and similar notch, not shown, that rides on guide track 100.

If desired, the left and right travel of the carriage 90 may also be guided by a guide pin 110 that may be attached to the carriage 90. The guide pin 110 slides through a guide hole 112 provided in a secondary bulkhead 114 provided in the cylindrical wall 42 of the first hinge half 24. The secondary bulkhead 114 may have a clearance hole 116 that will allow the electric motor 86 to pass through the secondary bulkhead 114 without interference.

In operation, FIG. 3 shows the locking hinge 22 in the locked condition in which the front frame 12 is locked to the rear frame 16 by the presence of the threaded shaft 72 which is threadedly engaged with both the internal threads 62 of the hex nut 64 on the bulkhead 50 and the internal threads 68 of the hex nut 70 on the bulkhead 52. In order to unlock the locking hinge 22, the electric motor 86 is energized causing the toothed gear 92 of the electric motor 86 to rotate the toothed gear 84 of the bolt 80. As the bolt 80 turns within the hex nut 64, the threaded shaft 72 is withdrawn in a leftward direction which in turn causes the toothed gear 84 attached to the bolt head 82 to move leftward. The carriage 90, being mounted on the track mechanism 96 provided by the guide tracks 98 and 100, is permitted to move leftwardly with the threaded shaft 72 as the threaded shaft 72 is withdrawn from the internal threads 68 of the hex nut 70 provided on the bulkhead 52. During the leftward movement of the carriage 90, the guide pin 110 and track mechanism 96 will guide and support the carriage 90 for smooth and nonbinding travel within the cylindrical wall 42 of the first hinge half 24.

As seen in FIG. 4 the threaded shaft 72 has been withdrawn leftwardly so that the threaded shaft 72 has been fully withdrawn from engagement with the internal threads 68 of the hex nut 70 of the bulkhead 52. Accordingly the front frame 12 and the rear frame 16 maybe folded relative one another about the hinge axis 32 defined by the pivot pin 30. Folding of the frames 12 and 16 relative one another allows the bicycle 10 to assume its folded position of FIG. 2 in which the bicycle may be easily stored.

When the user desires to ride the bicycle 10, the bicycle 10 will be unfolded from the position of FIG. 2 to the riding position of FIG. 1. The electric motor 86 is energized to rotate the threaded shaft 72 in the direction to advance and extend the shaft in the rightward direction so that the threaded shaft 72 will once again become threaded into the internal threads 68 of the nut 70 on the bulkhead 52 of the second hinge half 26, thereby once again locking the front and rear frames relative to one another.

As stated hereinbefore, the internal threads may be provided on the bulkheads by the provision of the hex nuts on the bulkheads. However many alternatives may be employed to provide such internal threads. For example, the bulkheads may themselves be provided by simply pressing a larger size hex nut directly into the cylindrical wall of the hinge half. Although the above description shows the example where the guide pin 110 may be attached to the carriage, as an alternative, the guide pin 110 may be attached to the end of the threaded shaft at or near the toothed gear and extend through a guide hole provided in the carriage. Although FIG. 3 shows the example where the locking hinge is manufactured by providing the first hinge half and second hinge half for insertion into the ends of the tubular frames, the various elements of the locking hinge may be installed directly into the open ends of the front frame and rear frame. For example, the hex nuts could be press fit directly into the ends of the front frame and rear frame.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a locking hinge mechanism for a tubular frame and may include a first tubular frame and a second tubular frame connected by a hinge for movement relative one another between folded and unfolded positions; a threaded shaft rotatably mounted in the first tubular frame to selectively rotate and advance from the first tubular frame and rotate and withdraw into the first tubular frame; an internally threaded nut mounted in the second tubular frame; and a motor mechanism for rotating the threaded shaft in one direction to thereby advance the threaded shaft into threaded engagement with the internally threaded nut when the first and second frame are in an unfolded position to lock the first and second frame at the unfolded position, and for rotating the threaded shaft in another direction to withdraw the threaded shaft from the internally threaded nut so that the first and second tubular frames may be moved from the unfolded position to the folded position.

Variation 2 may include a locking hinge mechanism as set forth in variation 1 and further comprising the first and second tubular frames each having a longitudinal axis, and the longitudinal axes being co-axial with one another in the unfolded position.

Variation 3 may include a locking hinge mechanism as set forth in any of variations 1-2 and further comprising the hinge being located on the outside of the first and second tubular frames.

Variation 4 may include a locking hinge mechanism as set forth in any of variations 1-3 and further comprising a first bulkhead extending transversely within the first tubular frame and the threaded shaft being mounted on threads provided on the first bulkhead.

Variation 5 may include a locking hinge mechanism as set forth in any of variations 1-4 and further comprising a hex nut attached to a first bulkhead extending transversely within the first tubular frame and the threaded shaft being threadedly engaged with threads of the hex nut.

Variation 6 may include a locking hinge mechanism as set forth in any of variations 1-5 and further comprising a second bulkhead extending transversely within the second tube and the internally threaded nut being provided by a hex nut mounted on the second bulkhead.

Variation 7 may include a locking hinge mechanism as set forth in any of variations 1-6 and further comprising a carriage mounted for longitudinal movement on a track mechanism within the first tubular frame, and the motor mechanism being mounted on the carriage so that the motor mechanism advances and withdraws with the threaded shaft.

Variation 8 may include a locking hinge mechanism as set forth in any of variations 1-7 and further comprising the threaded shaft having a first toothed gear integral therewith and meshing with a second toothed gear driven by the motor mechanism.

Variation 9 may include a locking hinge mechanism as set forth in any of variations 1-8 and wherein the threaded shaft is provided by a threaded bolt having a head, the head having a first toothed gear, and the motor mechanism having a second tooth gear driving the first toothed gear.

Variation 10 may include a locking hinge mechanism as set forth in any of variations 1-9 and further comprising the threaded shaft being hollow.

Variation 11 may include a locking hinge mechanism for a tubular frame and may include a first tubular frame; a second tubular frame; a hinge acting between an end of the first tubular frame and an end of the second tubular frame to permit movement of the first and second tubular frames between folded and unfolded positions, a first bulkhead provided at the end of the first tubular frame; a second bulkhead provided at the end of the second tubular frame; a first internally threaded nut mounted on the first bulkhead and a second internally threaded nut provided on the second bulkhead; a threaded shaft threadedly mounted in the first internally threaded nut and rotatable therein so that the threaded shaft advances into and withdraws out of the second internally threaded nut; and a motor mechanism for rotating the threaded shaft in one direction to thereby advance the threaded shaft into the second internally threaded nut when the first and second frame portions are in the unfolded position to lock the first and second frame portions at the unfolded position, and for rotating the threaded shaft in another direction to withdraw the threaded shaft from the second internally threaded nut so that the first and second tubular frames may be moved from the unfolded position to the folded position.

Variation 12 may include a locking hinge mechanism as set forth in variation 11 and further comprising the hinge being located on the outside of the first and second tubular frames.

Variation 13 may include a locking hinge mechanism as set forth in any of variations 11-12 and further comprising a carriage mounted for longitudinal movement on a track mechanism within the first tubular frame, and the motor mechanism being mounted on the carriage so that the motor mechanism advances and withdraws with the threaded shaft.

Variation 14 may include a locking hinge mechanism as set forth in any of variations 11-13 and further comprising a carriage mounted for longitudinal movement on a track mechanism within the first tubular frame, the track mechanism having at least one guide track formed integrally on the first tubular frame portion and the carriage having a notch engaging with the at least one guide track, and the motor mechanism being mounted on the carriage so that the motor mechanism advances and withdraws with the threaded shaft.

Variation 15 may include a locking hinge mechanism as set forth in any of variations 11-14 and further comprising a carriage mounted for longitudinal movement on a track mechanism within the first tubular frame, the track mechanism having a guide pin mounted on one of the carriage or the threaded shaft and sliding through a guide hole provided in a secondary bulkhead provided in the first tubular frame portion; and the motor mechanism being mounted on the carriage so that the motor mechanism advances and withdraws with the threaded shaft.

Variation 16 may include a locking hinge mechanism as set forth in any of variations 11-15 further comprising the threaded shaft having a first toothed gear integral therewith and meshing with a second toothed gear driven by the motor mechanism.

Variation 17 may include a locking hinge mechanism as set forth in any of variations 11-16 and wherein the threaded shaft is provided by a threaded bolt having a head, the head having a first toothed gear, and the motor mechanism includes a second tooth gear driving the first toothed gear.

Variation 18 may include a locking hinge mechanism for a tubular frame and may include a first tubular frame and a second tubular frame connected by a hinge for movement relative one another between folded and unfolded positions; a threaded shaft rotatably mounted in the first tubular frame to selectively rotate and advance from the first tubular frame and rotate and withdraw into the first tubular frame; a carriage mounted on a track mechanism within the first tubular frame to advance and withdraw with the threaded shaft; a motor mechanism mounted on the carriage for rotating the threaded shaft in one direction to thereby advance the threaded shaft from the first tubular frame and withdraw the threaded shaft into the first tubular frame; and an internally threaded nut mounted in the second tubular frame; said threaded shaft being rotated and advanced by the motor mechanism into threaded engagement with the internally threaded nut when the first and second frame are in an unfolded position to lock the first and second frame at the unfolded position, and said threaded shaft being rotated and withdrawn by the motor mechanism to withdraw the threaded shaft from the internally threaded nut so that the first and second tubular frames may be moved from the unfolded position to the folded position.

Variation 19 may include a locking hinge mechanism as set forth in variation 18 further comprising the threaded shaft having a first toothed gear integral therewith and meshing with a second toothed gear driven by the motor mechanism.

Variation 20 may include a locking hinge mechanism as set forth in any of variations 18-19 and further comprising the threaded shaft being provided by a threaded bolt having a head, the head having a first toothed gear, and the motor mechanism includes a second tooth gear driving the first toothed gear.

The above description of select variations within the scope of the invention is merely illustrative in nature and, thus, variations or variants thereof are not to be regarded as a departure from the spirit and scope of the invention.

The invention claimed is:

1. A locking hinge mechanism for tubular frame, comprising:
    a first tubular frame and a second tubular frame connected by a hinge for movement relative one another between folded and unfolded positions;
    a threaded shaft rotatably mounted in the first tubular frame to selectively rotate and advance from the first tubular frame and rotate and withdraw into the first tubular frame;
    an internally threaded nut mounted in the second tubular frame;
    and a motor mechanism for rotating the threaded shaft in one direction to thereby advance the threaded shaft into threaded engagement with the internally threaded nut when the first and second frame are in an unfolded position to lock the first and second frame at the unfolded position, and for rotating the threaded shaft in another direction to withdraw the threaded shaft from the internally threaded nut so that the first and second tubular frames may be moved from the unfolded position to the folded position.

2. The locking hinge mechanism of claim 1 further comprising the first and second tubular frames each having a longitudinal axis, and the longitudinal axes being co-axial with one another in the unfolded position.

3. The locking hinge mechanism of claim 1 further comprising the hinge being located on the outside of the first and second tubular frames.

4. The locking hinge mechanism of claim 1 further comprising a first bulkhead extending transversely within the first tubular frame and the threaded shaft being mounted on threads provided on the first bulkhead.

5. The locking hinge mechanism of claim 1 further comprising a hex nut attached to a first bulkhead extending transversely within the first tubular frame and the threaded shaft being threadedly engaged with threads of the hex nut.

6. The locking hinge mechanism of claim 1 further comprising a second bulkhead extending transversely within the second tube and the internally threaded nut being provided by a hex nut mounted on the second bulkhead.

7. The locking hinge mechanism of claim 1 further comprising a carriage mounted for longitudinal movement on a track mechanism within the first tubular frame, and the motor mechanism being mounted on the carriage so that the motor mechanism advances and withdraws with the threaded shaft.

8. The locking hinge mechanism of claim 1 further comprising the threaded shaft having a first toothed gear integral therewith and meshing with a second toothed gear driven by the motor mechanism.

9. The locking hinge mechanism of claim 1 wherein the threaded shaft is provided by a threaded bolt having a head, the head having a first toothed gear, and the motor mechanism having a second tooth gear driving the first toothed gear.

10. The locking hinge mechanism of claim 1 further comprising the threaded shaft being hollow.

11. A locking hinge mechanism for a folding bicycle frame, comprising:
    a first tubular frame;
    a second tubular frame;
    a hinge acting between an end of the first tubular frame and an end of the second tubular frame to permit movement of the first and second tubular frames between folded and unfolded positions,
    a first bulkhead provided at the end of the first tubular frame;
    a second bulkhead provided at the end of the second tubular frame;
    a first internally threaded nut mounted on the first bulkhead and a second internally threaded nut provided on the second bulkhead;
    a threaded shaft threadedly mounted in the first internally threaded nut and rotatable therein so that the threaded shaft advances into and withdraws out of the second internally threaded nut;
    and a motor mechanism for rotating the threaded shaft in one direction to thereby advance the threaded shaft into the second internally threaded nut when the first and second frame portions are in the unfolded position to lock the first and second frame portions at the unfolded position, and for rotating the threaded shaft in another direction to withdraw the threaded shaft from the second internally threaded nut so that the first and second tubular frames may be moved from the unfolded position to the folded position.

12. The locking hinge mechanism of claim 11 further comprising the hinge being located on the outside of the first and second tubular frames.

13. The locking hinge mechanism of claim 11 further comprising a carriage mounted for longitudinal movement on a track mechanism within the first tubular frame, and the motor mechanism being mounted on the carriage so that the motor mechanism advances and withdraws with the threaded shaft.

14. The locking hinge mechanism of claim 11 further comprising a carriage mounted for longitudinal movement on a track mechanism within the first tubular frame, the track mechanism having at least one guide track formed integrally on the first tubular frame portion and the carriage having a notch engaging with the at least one guide track, and the motor mechanism being mounted on the carriage so that the motor mechanism advances and withdraws with the threaded shaft.

15. The locking hinge mechanism of claim 11 further comprising a carriage mounted for longitudinal movement on a track mechanism within the first tubular frame, the track mechanism having a guide pin mounted on one of the carriage or the threaded shaft and sliding through a guide hole provided in a secondary bulkhead provided in the first tubular frame portion; and the motor mechanism being mounted on the carriage so that the motor mechanism advances and withdraws with the threaded shaft.

16. The locking hinge mechanism of claim 11 further comprising the threaded shaft having a first toothed gear integral therewith and meshing with a second toothed gear driven by the motor mechanism.

17. The locking hinge mechanism of claim 11 wherein the threaded shaft is provided by a threaded bolt having a head, the head having a first toothed gear, and the motor mechanism includes a second tooth gear driving the first toothed gear.

18. A locking hinge mechanism for tubular frame, comprising:
    a first tubular frame and a second tubular frame connected by a hinge for movement relative one another between folded and unfolded positions;
    a threaded shaft rotatably mounted in the first tubular frame to selectively rotate and advance from the first tubular frame and rotate and withdraw into the first tubular frame;
    a carriage mounted on a track mechanism within the first tubular frame to advance and withdraw with the threaded shaft;
    a motor mechanism mounted on the carriage for rotating the threaded shaft in one direction to thereby advance the threaded shaft from the first tubular frame and withdraw the threaded shaft into the first tubular frame;
    and an internally threaded nut mounted in the second tubular frame;
    said threaded shaft being rotated and advanced by the motor mechanism into threaded engagement with the internally threaded nut when the first and second frame are in an unfolded position to lock the first and second frame at the unfolded position, and said threaded shaft being rotated and withdrawn by the motor mechanism to withdraw the threaded shaft from the internally threaded nut so that the first and second tubular frames may be moved from the unfolded position to the folded position.

19. The locking hinge mechanism of claim 18 further comprising the threaded shaft having a first toothed gear integral therewith and meshing with a second toothed gear driven by the motor mechanism.

20. The locking hinge mechanism of claim 18 further comprising the threaded shaft being provided by a threaded bolt having a head, the head having a first toothed gear, and the motor mechanism includes a second tooth gear driving the first toothed gear.

* * * * *